US012613890B2

(12) United States Patent
Balupari et al.

(10) Patent No.: US 12,613,890 B2
(45) Date of Patent: *Apr. 28, 2026

(54) MULTI-LABEL CLASSIFIER TRAINING

(71) Applicant: Netskope, Inc., Santa Clara, CA (US)

(72) Inventors: Ravindra K. Balupari, San Jose, CA (US); Sandeep Yadav, South San Francisco, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/029,819

(22) Filed: Jan. 17, 2025

(65) Prior Publication Data

US 2025/0165508 A1 May 22, 2025

Related U.S. Application Data

(63) Continuation of application No. 18/476,484, filed on Sep. 28, 2023, now Pat. No. 12,242,520, which is a continuation of application No. 17/396,503, filed on Aug. 6, 2021, now Pat. No. 11,809,467, which is a continuation of application No. 16/226,394, filed on Dec. 19, 2018, now Pat. No. 11,087,179.

(51) Int. Cl.
| | |
|---|---|
| *G06F 16/31* | (2019.01) |
| *G06F 16/35* | (2025.01) |
| *G06F 16/951* | (2019.01) |
| *G06F 18/2411* | (2023.01) |
| *G06N 20/10* | (2019.01) |

(52) U.S. Cl.
CPC ............ *G06F 16/313* (2019.01); *G06F 16/35* (2019.01); *G06F 16/951* (2019.01); *G06F 18/2411* (2023.01); *G06N 20/10* (2019.01)

(58) Field of Classification Search
CPC ...... G06F 16/313; G06F 16/334; G06F 16/35; G06F 16/337; G06F 16/93; G06F 16/951
USPC ............. 707/737, 738, 203, 693, 531; 704/9
See application file for complete search history.

(56) References Cited

U.S. PATENT DOCUMENTS

| | | | | |
|---|---|---|---|---|
| 6,006,221 A * | 12/1999 | Liddy | ..................... | G06F 16/93 |
| | | | | 707/999.005 |
| 6,701,294 B1 * | 3/2004 | Ball | ...................... | G06F 16/243 |
| | | | | 704/9 |
| 6,925,453 B1 * | 8/2005 | Bergman | ............... | G06N 5/022 |
| | | | | 706/20 |
| 7,139,754 B2 * | 11/2006 | Goutte | .................. | G06F 16/353 |
| | | | | 707/999.005 |

(Continued)

*Primary Examiner* — Shahid A Alam

(57) ABSTRACT

The technology disclosed includes a system to perform multi-label support vector machine (SVM) classification of a document. The system creates document features representing frequencies or semantics of words in the document. Trained SVM classification parameters for a plurality of labels are applied to the document features for the document. The system determines positive and negative distances between SVM hyperplanes for the labels and the feature vector. Labels with positive distance to the feature vector are harvested. When the distribution of negative distances is characterized by a mean and standard deviation, the system further harvests the labels with a negative distance such that the harvested labels include the labels with a negative distance between the mean negative distance and zero and separated from the mean negative distance by a predetermined first number of standard deviations.

20 Claims, 10 Drawing Sheets

(56)          References Cited

U.S. PATENT DOCUMENTS

| | | | | | |
|---|---|---|---|---|---|
| 7,356,187 | B2 * | 4/2008 | Shanahan | ........... | G06F 16/3347 |
| | | | | | 707/E17.08 |
| 7,668,789 | B1 * | 2/2010 | Forman | ................. | G06N 20/00 |
| | | | | | 706/15 |
| 7,835,902 | B2 * | 11/2010 | Gamon | ................. | G06F 40/30 |
| | | | | | 704/7 |
| 7,912,805 | B2 * | 3/2011 | Brown | ................... | G06F 16/20 |
| | | | | | 706/20 |
| 8,311,957 | B2 * | 11/2012 | Kirshenbaum | .......... | G06N 5/02 |
| | | | | | 706/45 |
| 8,533,148 | B1 * | 9/2013 | Feuersanger | ....... | G06F 16/3346 |
| | | | | | 706/62 |
| 8,885,928 | B2 * | 11/2014 | Forman | .............. | G06F 18/2113 |
| | | | | | 382/155 |
| 2005/0130109 | A1 * | 6/2005 | Kirshenbaum | .......... | G09B 7/00 |
| | | | | | 434/322 |
| 2005/0228783 | A1 * | 10/2005 | Shanahan | ........... | G06F 16/3347 |
| | | | | | 707/E17.08 |
| 2009/0119572 | A1 * | 5/2009 | Koivunen | ........... | G06F 16/9562 |
| | | | | | 707/999.103 |
| 2010/0223261 | A1 * | 9/2010 | Sarkar | ................. | G06F 16/9538 |
| | | | | | 707/726 |
| 2010/0332475 | A1 * | 12/2010 | Birdwell | ............. | G06F 18/2323 |
| | | | | | 707/E17.014 |
| 2011/0078099 | A1 * | 3/2011 | Weston | ................. | G16B 40/20 |
| | | | | | 706/12 |
| 2011/0099500 | A1 * | 4/2011 | Smith | .................... | H04L 41/22 |
| | | | | | 715/771 |
| 2013/0097166 | A1 * | 4/2013 | Fink | ........................ | G06F 16/35 |
| | | | | | 707/E17.089 |
| 2013/0158982 | A1 * | 6/2013 | Zechner | ................. | G09B 19/06 |
| | | | | | 704/9 |
| 2014/0095493 | A1 * | 4/2014 | Feuersanger | ....... | G06F 16/3346 |
| | | | | | 707/728 |
| 2015/0242486 | A1 * | 8/2015 | Chari | ..................... | G06F 16/35 |
| | | | | | 707/737 |
| 2018/0121533 | A1 * | 5/2018 | Magnani | .............. | G06F 16/285 |
| 2019/0019061 | A1 * | 1/2019 | Trenholm | ........... | G06F 18/2411 |

* cited by examiner

Figure 2:
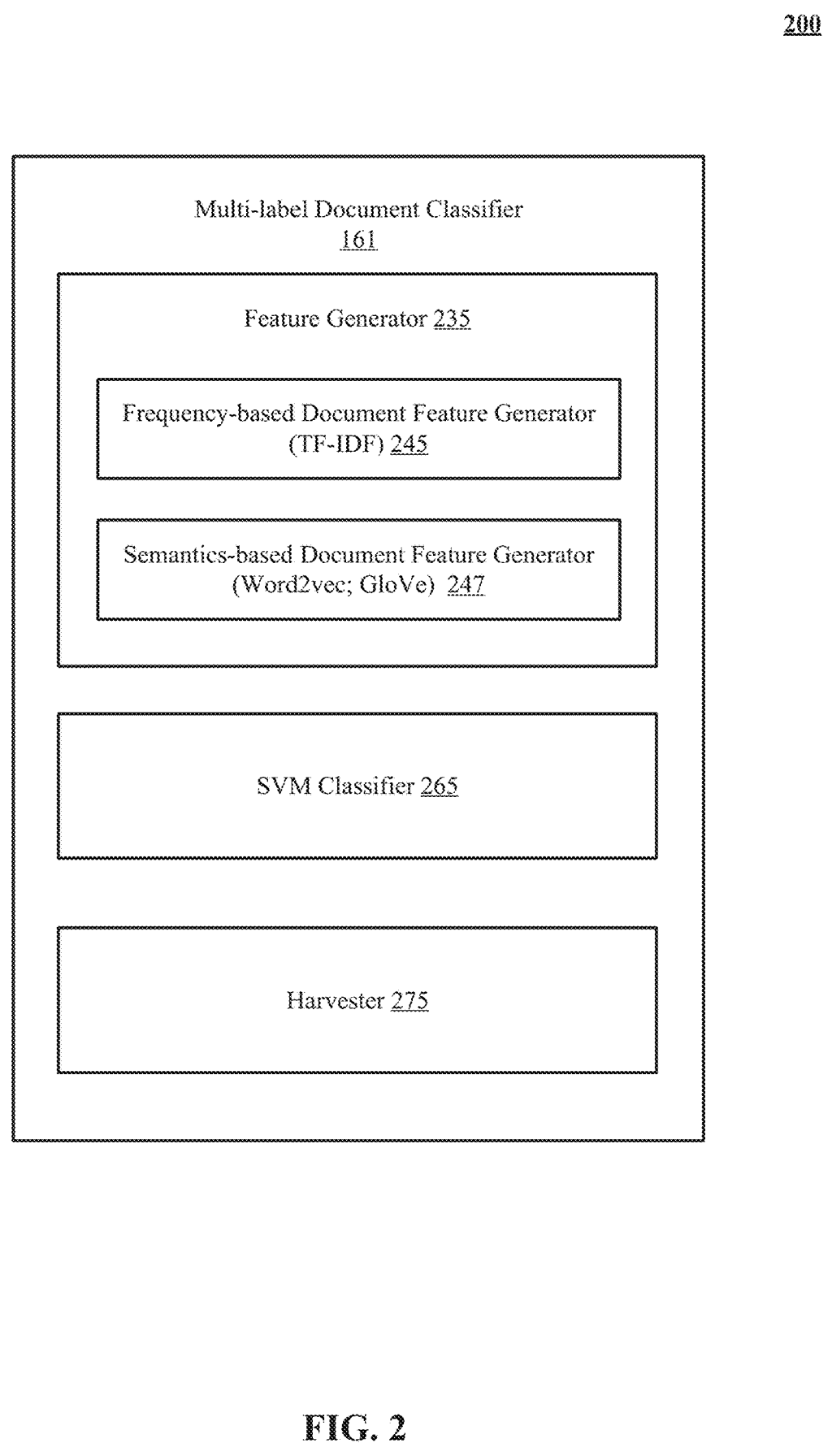

Multi-label Document Classifier
161

Feature Generator 235

Frequency-based Document Feature Generator (TF-IDF) 245

Semantics-based Document Feature Generator (Word2vec; GloVe) 247

SVM Classifier 265

Harvester 275

Low Regularization value 471        High Regularization value 476

600

900

MULTI-LABEL CLASSIFIER TRAINING

PRIORITY APPLICATION

This application is a continuation of and claims priority to U.S. patent application Ser. No. 18/476,484, titled "TRAINING A MULTI-LABEL CLASSIFIER," filed Sep. 28, 2023, which is a continuation of and claims priority to U.S. patent application Ser. No. 17/396,503, titled "TRAINED MULTI-LABEL SUPPORT VECTOR MACHINE RUNNING A ONE-VS-THE-REST CLASSIFIER," filed Aug. 6, 2021, issued Nov. 7, 2023 as U.S. Pat. No. 11,809,467, which is a continuation of and claims priority to U.S. patent application Ser. No. 16/226,394, titled "MULTI-LABEL CLASSIFICA-TION OF TEXT DOCUMENTS," filed Dec. 19, 2018, issued Aug. 10, 2021 as U.S. Pat. No. 11,087,179, each of which are incorporated by reference in their entireties for all purposes.

INCORPORATIONS

The following materials are incorporated by reference as if fully set forth herein:

U.S. Nonprovisional patent application Ser. No. 14/198, 508, titled "SECURITY FOR NETWORK DELIVERED SERVICES," filed on Mar. 5, 2014, issued as U.S. Pat. No. 9,270,765 on Feb. 23, 2016);

U.S. Nonprovisional patent application Ser. No. 15/368, 240, titled "SYSTEMS AND METHODS OF ENFORCING MULTI-PART POLICIES ON DATA-DEFICIENT TRANSACTIONS OF CLOUD COMPUTING SER-VICES," filed on Dec. 2, 2016, issued as U.S. Pat. No. 10,826,940 on Nov. 3, 2020; and U.S. Provisional Patent Application No. 62/488,703, titled "REDUCING LATENCY AND ERROR IN SECURITY ENFORCEMENT BY A NETWORK SECURITY SYS-TEM (NSS)," filed on Apr. 21, 2017.

FIELD OF THE TECHNOLOGY DISCLOSED

The technology disclosed relates to multi-label classifi-cation of documents obtained from a wide variety of website classes for implementing fine grained enterprise policies.

BACKGROUND

The subject matter discussed in this section should not be assumed to be prior art merely as a result of its mention in this section. Similarly, a problem mentioned in this section or associated with the subject matter provided as back-ground should not be assumed to have been previously recognized in the prior art. The subject matter in this section merely represents different approaches, which in and of themselves can also correspond to implementations of the claimed technology.

Access to information via efficient search engines makes the World Wide Web (WWW) the first choice of enterprise users for many types of information. However, many web-sites contain content that can be offensive in a workplace or can be infected with virus or malware. Enterprises attempt to filter out websites that contain inappropriate content. Websites can contain information related to multiple topics e.g., finance, education, politics, etc. A large number of label classes are required to classify hundreds of millions of websites on the World Wide Web (WWW). One challenge faced by enterprises is to identify websites that meet the criteria for filtering. Another challenge is to apply enterprise policies when each website contains content related to multiple topics.

Therefore, an opportunity arises to automatically assign multiple class labels to a website for efficient implementa-tion of enterprise policies to filter out inappropriate web-sites.

BRIEF DESCRIPTION OF THE DRAWINGS

In the drawings, like reference characters generally refer to like parts throughout the different views. Also, the draw-ings are not necessarily to scale, with an emphasis instead generally being placed upon illustrating the principles of the technology disclosed. In the following description, various implementations of the technology disclosed are described with reference to the following drawings, in which:

FIG. 2 is a block diagram of example components of the multi-label document classifier of FIG. 1.

DETAILED DESCRIPTION

Figure 1:
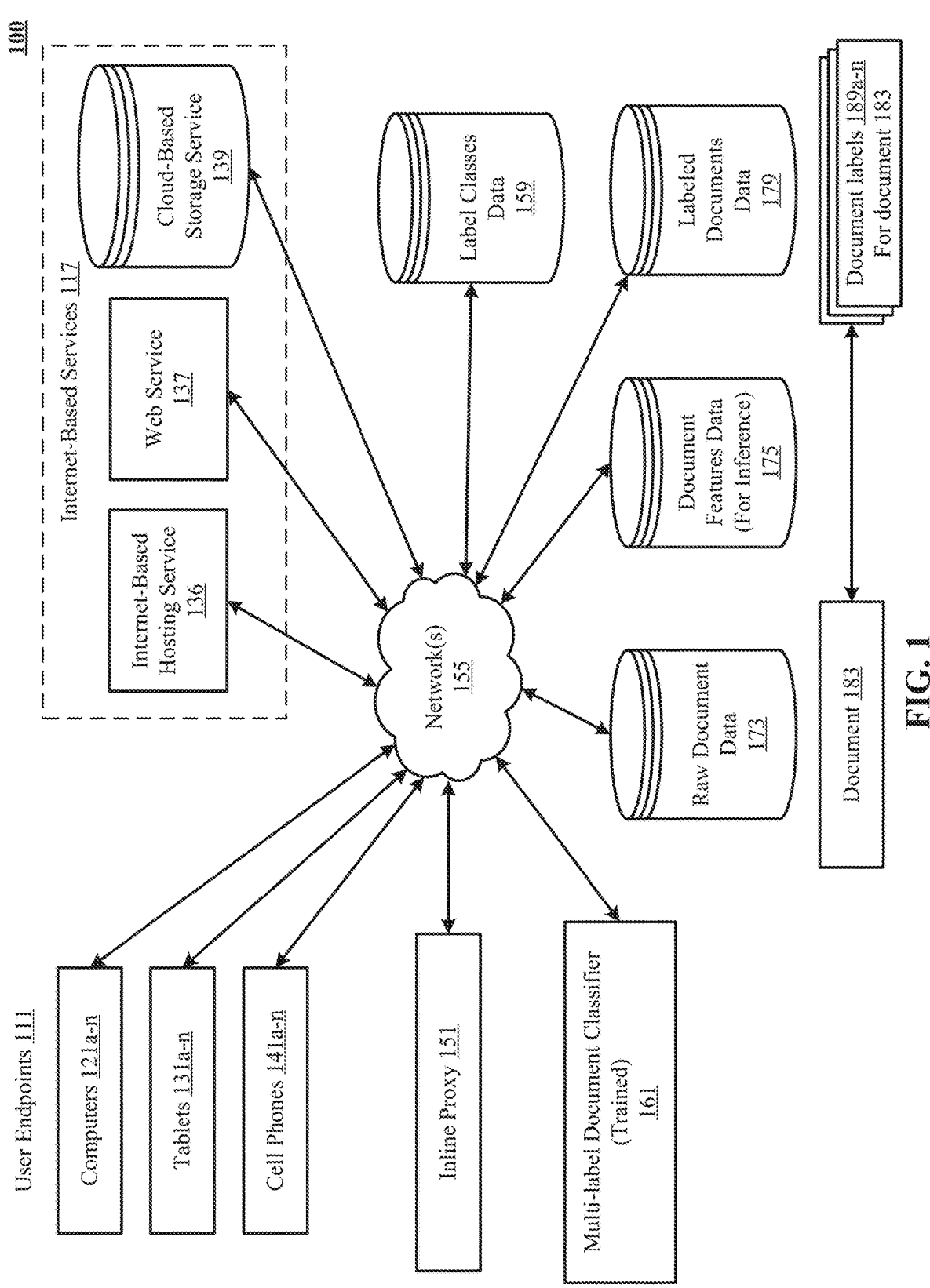
FIG. 1 illustrates an architectural level schematic of a system in which a trained multi-label document classifier is used to harvest labels for documents hosted on Internet-based services.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Introduction

Enterprise users access Internet-based services on a daily basis to search a wide variety of website classes. Efficient search engines make the World Wide Web (WWW) the first choice for access to many types of information. The websites found can be offensive in a workplace or can be infected with viruses or malware. Both of these problems correlate with certain classes of websites, such as gambling, adult, tobacco, and violence-oriented websites. The risk faced by the organizations can be mitigated by fine grained enterprise policies that can be applied by website class.

Websites often contain content that belongs to more than one category, even when the number of categories is limited to a practical number for policy application, such as 50 to 250 categories for fine grained policies. It is useful to classify a website with multiple categories that are relevant. For instance, the landing page for mil.com is a federal government webpage for the Department of Defense, it includes information about filing tax returns in a right side panel that would be a banner ad, if this were a commercial website. This page should receive labels for both military and financial/accounting.

One technology for assigning multiple labels to a document is a support vector machine running a one-vs-the-rest (OvR) classifier. This SVM classifier positions a hyperplane between feature vectors support for a ground truth label vs feature vector support for the rest of the available labels. This hyperplane is traditionally used to distinguish between the most applicable label for the document and the rest of the available labels. For a small number of labels, such as 3 to 5, this SVM classifier can be expected to apply multiple labels to some documents, applying a default labeling threshold value. For a large number of labels, over 50, this SVM classifier practically leaves a large proportion of sample documents unlabeled and is unlikely to apply multiple labels.

The technology disclosed modifies the traditional one-versus-the-rest-classifier and directly uses distances (typically calculated as dot products) between sample documents and hyperplanes for each of the available labels. The technology optionally can perform labeling in tiers, thereby increasing the likelihood that at least one label will be applied, despite the difficulty of coaxing a label from a one versus the rest classifier when there are more than 50 labels. During training, the one-versus-the-rest-classifier is trained N times for N labels, producing N hyperplanes. The training results, including hyperplane positions, are made available for inference. During inference, a feature vector for a sample document is analyzed N times using hyperplanes derived by the N trained SVMs to determine positive or negative distances between the feature vector and the hyperplanes for the respective labels.

The technology disclosed calculates the distance results (positive and negative) between the feature vector and the SVM hyperplanes for the available labels to harvest multiple labels. Many documents may receive more than one label. It is allowable for a document to remain unlabeled. It is preferred for documents to receive at least one label.

The tier 1 labels include all labels with a positive distance. The labels with negative distances to hyperplanes follow a Gaussian distribution characterized by a mean and a standard deviation. The tier 1 labels further include labels with negative distances that are strongly separated from the distribution. In one implementation, the tier 1 labels include harvested labels with a negative distance between the mean negative and zero. These labels are separated from the mean negative distance by at least 3 standard deviations. If harvesting for tier 1 labels does not result in any class labels, the technology disclosed harvests tier 2 labels. Tier 2 class labels include class labels with a negative distance between the mean distance and 3 standard deviations. These labels are separated from the mean negative distance by at least 2.5 standard deviations.

System Overview

We describe a system and various implementations for multi-label classification of a website hosted on a network, typically the Internet. FIG. 1 shows an architectural level schematic of a system in accordance with an implementation. Because FIG. 1 is an architectural diagram, certain details are intentionally omitted to improve clarity of the description. The discussion of FIG. 1 will be organized as follows. First, the elements of the figure will be described, followed by their interconnections. Then, the use of the elements in the system will be described in greater detail.

FIG. 1 includes the system 100. The system 100 includes user endpoints 111, an Internet-based hosting service 136, a web service 137, a cloud-based storage service 139, an inline proxy 151, a trained multi-label document classifier 161, a label classes database 159, a raw document database 173, a document features database 175, a labeled document database 179, and a network(s) 155. Internet-based hosting service 136, the web service 137, and the cloud-based storage service 139 are collectively referred to as Internet-based services 117. For a document 183 from a website or the raw document database, document labels 189a-n are stored in the labeled document database 179.

User endpoints 111 such as computers 121a-n, tablets 131a-n, and cell phones 141a-n access and interact with data stored on the Internet-based services 117. This access and interaction is modulated by an inline proxy 151 that is interposed between the user endpoints and the Internet-based services 117. The inline proxy 151 monitors network traffic between user endpoints 111 and the Internet-based services 117 to implement fine grained enterprise policies that can be applied by website class. The inline proxy 151 can be an Internet-based proxy or a proxy appliance located on premise.

In a "managed device" implementation, user endpoints 111 are configured with routing agents (not shown) which ensure that requests for the Internet-based services 117 originating from the user endpoints 111 and response to the requests are routed through the inline proxy 151 for policy enforcement. Once the user endpoints 111 are configured with the routing agents, they are under the ambit or purview of the inline proxy 151, regardless of their location (on premise or off premise).

In an "unmanaged device" implementation, certain user endpoints that are not configured with the routing agents can still be under the purview of the inline proxy 151 when they are operating in an on premise network monitored by the inline proxy 151.

The interconnection of the elements of system 100 will now be described. The network(s) 155, couples the computers 121a-n, the tablets 131a-n, the cell phones 141a-n, the Internet-based services 117, the trained multi-label document classifier 161, the label classes databases 159, the raw document database 173, the document features database 175, the labeled document database 179, and the inline proxy 151, all in communication with each other (indicated by solid double-arrowed lines). The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. The engines or system components of FIG. 1 are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, SecureID, digital certificates and more, can be used to secure the communications.

The Internet-based services 117 can include Internet hosted services such as news websites, blogs, video streaming websites, social media websites, hosted services, cloud applications, cloud stores, cloud collaboration and messaging platforms, and/or cloud customer relationship management (CRM) platforms. Internet-based services 117 can be accessed using a browser (e.g., via a URL) or a native application (e.g., a sync client). The websites hosted by the Internet-based services 117 and exposed via URLs/APIs can fit in more than one classes assigned by the multi-label document classifier 161.

Enterprise users access tens or hundreds of websites on a daily basis to access many types of information. The technology disclosed organizes websites in classes. For example, the websites providing information about education belong to education class. Examples include websites of universities, colleges, schools, and online education websites. The websites providing such information are labeled with "education" class label. However, almost all websites contain information that can be classified in multiple classes. For example, an online education website "ryrob.com/online-business-courses/" provides a list of business courses with a brief introduction to each course and the instructor. This website can be labeled with at least two class labels "education" and "business." The website also offers forums for users to post their questions and comments, therefore the website can be assigned a third label "forums." As the website is created and maintained by an individual, it can be labeled as belonging to "personal sites & blogs" class. A website most likely has multiple labels based on its content. Enterprises can classify websites in tens or hundreds of classes. More than fifty classes of websites have been identified. The examples include education, business, military, science, finance/accounting, shopping, news & media, personal sites & blogs, entertainment, food & drink, government & legal, health & nutrition, insurance, lifestyle, etc. The number of classes can range between 50 to 250 label classes. In some working examples, data sets have had 70 and 108 label classes, both of which fall within the range of 50 to 250 label classes. The technology described can be applied to 50 to 500 label classes or to 50 to 1,000 label classes, as the classifiers described can be adapted to choosing among labels in those sizes of label sets. A person skilled in the art will appreciate that additional labels for classes of website can be applied to other present or future-developed websites without departing from the spirit and scope of the technology disclosed.

The system 100 stores raw document data for websites in raw document database 173. The raw document data is converted to document features for input to the multi-label document classifier 161. An example of document features is frequency features based on term frequency-inverse document frequency (TF-IDF). Other examples of document features include semantic features based on embedding in a multi-dimensional vector space using techniques such as Word2Vec or global vectors for word representations (GloVe). The system 100 stores class labels in the label classes database 159. The trained multi-label document classifier 161 takes document features data of a website and assigns one or more class labels to the website. The websites with their respective class labels are stored in labeled document database 179.

The Internet-based services 117 provide information to the users of the organization that is implementing enterprise policies directed to access, security and the like. When a user sends a request to an Internet-based service via an endpoint 121a, the inline proxy 151 intercepts the request message. The inline proxy 151 queries the labeled document database 179 to identify the website being accessed via a uniform resource locator (URL) or an application programming interface (API). In one implementation, the inline proxy 151 uses the URL in the request message to identify the website being accessed. The inline proxy 151 then queries the labeled document database 179 to identify class labels for the website. The class labels are used to implement the enterprise policy directed to manage website access. If the class labels for the website are among the classes allowed by the enterprise, the user endpoint 121a is allowed to access the website. Otherwise, if at least one class label of the website matches one of the class labels not allowed by the enterprise policy, the connection request from user endpoint 121a to the website is blocked, logged, aborted, or otherwise handled.

FIG. 2 is a block diagram 200 illustrating subsystem components of the multi-label document classifier 161. The multi-label document classifier 161 includes a feature generator 235, a support vector machine (SVM) classifier 265 and a harvester 275. The feature generator 235 creates document features representing frequencies or semantics of words in a document. The document can be a web page accessed via a uniform resource locator (URL) on the World Wide Web (WWW). More generally, the document can be any text document. In one implementation all contents from a webpage, for example, "www.espn.com," are included in the document and only HTML (Hypertext Markup Language) tags are discarded. The advertisements on the web page can be excluded from the document. The feature generator can create document features using frequency-based techniques or semantics-based techniques using a frequency-based document feature generator 245 or a semantics-based document feature generator 247.

An example of frequency features include term frequency-inverse document frequency (tf-idf) metric. The tf-idf metric (also referred to as tf-idf weight) is often used to measure how important a word (also referred to as "term") is to a document in a collection or corpus. The importance increases proportionally to the number of times a word appears in the document but is offset by the frequency of the word in the corpus. Variations of the tf-idf weighting scheme are often used by search engines as a tool in scoring and ranking a document's relevance given a user query.

The tf-idf weight is a product of two terms: term frequency (tf) and inverse document or domain frequency (idf). There are several variations on calculating tf-idf weights, any of which can be used with our method. Term frequency (tf) measures how frequently a term occurs in a document. This can either be as a count or as a proportion of the words in a document. When the proportion approach is used, the count for a term is divided by the total count of words in the document. Inverse document frequency (idf) measures the discriminating power of a term. Certain terms such as "is," "of," "that" appear in virtually every document, so they have little discriminating power for classification. Thus, "idf" down scales the weight given to frequent terms and up scales the rare ones. The "idf" for a term can be logarithmically scaled by taking a log of the total number of documents (in the universe being considered) divided by the number of documents with term "t" in them, such as a natural log or log to the base of 10. Sometimes the count of a term in the document population is increased by a pre-determined number, to avoid a rare divide-by-zero error. This variation on tf-idf calculation is within the scope of our disclosure and actually used by the scikit-learn library under some circumstances to calculate tf-idf.

In another implementation, the feature generator 235 uses semantic features based on word embedding in a multi-dimensional vector space using techniques such as Word2Vec or global vectors for word representation (GloVe). In semantic similarity, the idea of distance between terms is based on likeness of their meaning or semantic content as opposed to similarity regarding their syntactical representation (for example, their string format). For example, a "cat" is similar to a "dog" in that both are animals, are four-legged, pets, etc. Document features based on frequency features do not capture this semantic information. Document features based on semantic features represent words in a vector space where semantically similar words are mapped to nearby points or in other words are embedded nearby each other. Word2Vec and GloVe are two examples of mappings generated by machine learning that embed words in a vector space.

The SVM classifier 265 includes a supervised learning technique called support vector machine (SVM) for classification of documents. In one implementation, the SVM classifier 265 uses scikit-learn based linear support vector classification (LinearSVC) technique (http://scikit-learn.org/stable/modules/generated/sklearn.svm.LinearSVC.html). Scikit-learn is a free software machine learning library for the Python programming language. It features various classification, regression and clustering algorithms including support vector machines. Given labeled training data, an SVM outputs a hyperplane which classifies new examples. In a two dimensional space, this hyperplane is a line dividing a plane in two parts, with one class on either side. In a multi-label classification of documents, an SVM running a one-vs-the-rest classifier (OvR) is run as many times as the number of label classes to generate hyperplane determinations that separate label class from the rest. During inference, stored parameters of the SVM trained on the label classes are used to determine positive or negative distances between SVM hyperplanes for the labels and the feature vector representing the document.

The harvester 275, assigns multiple class labels to a document by harvesting the labels with a positive distance to the SVM hyperplanes. Consider distribution of class labels with negative distances is characterized by a mean and standard deviation. The harvester 275 also assigns class labels to the document by harvesting labels with a negative distance to the SVM hyperplanes using the following scheme. The harvester harvests labels with negative distances between the mean negative distance and zero and separated from the mean negative distance by a predetermined first number of standard deviations. In one implementation, when the above harvesting does not result in any labels for the document, the harvester further harvests labels with a negative distance between the mean negative distance and first number of standard deviations and separated from the mean negative distance by a predetermined second number of standard deviations.

Training the Multi-Label Document Classifier

Figure 3:
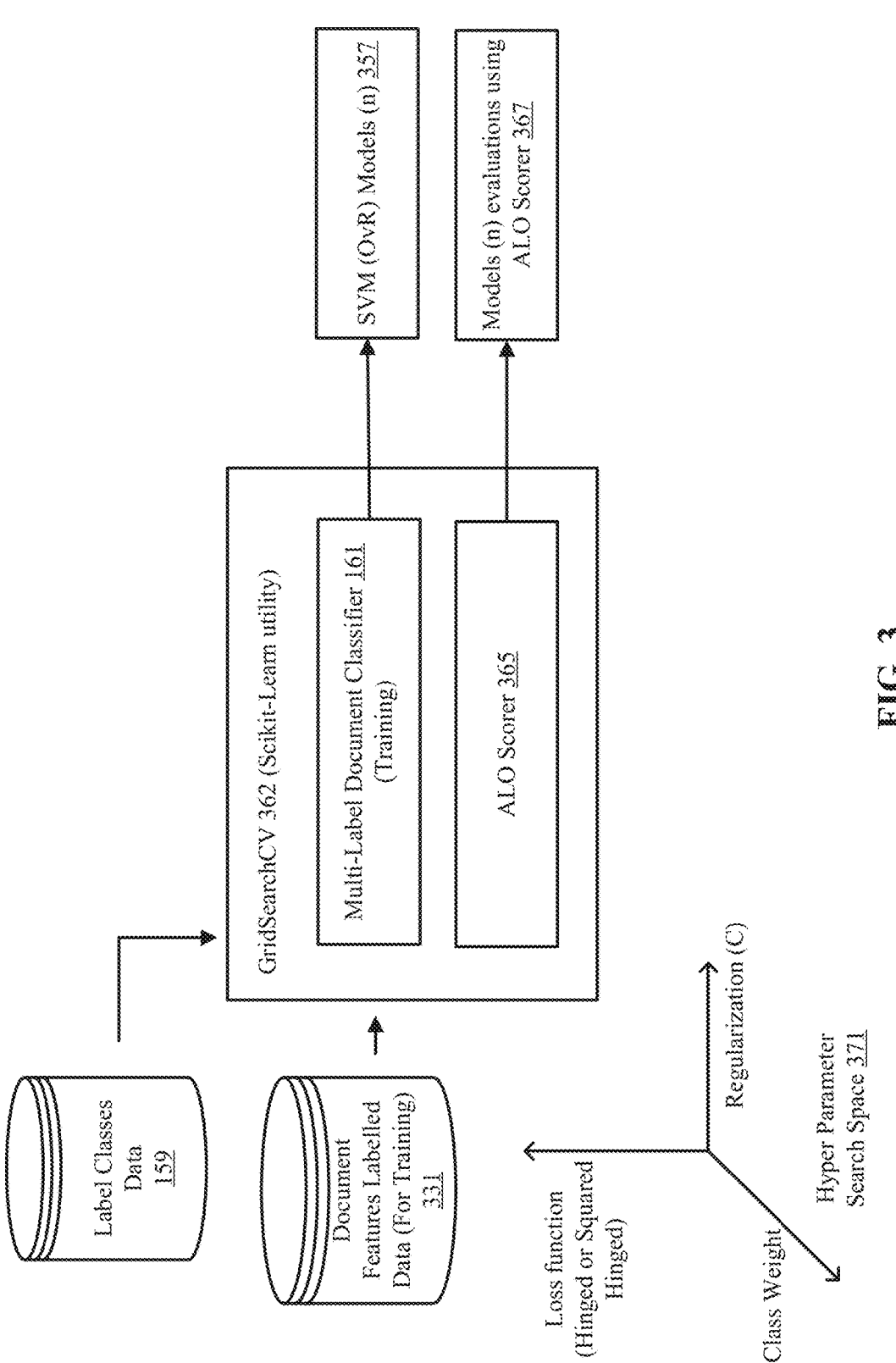
FIG. 3 illustrates generation of support vector machine (SVM) models running one-vs-the-rest (OvR) classifier fol-lowed by evaluation of the generated SVM models using at-least-one (ALO) scorer.

FIG. 3, referred to by a numeral 300, illustrates training of multi-label document classifier 161. A trained SVM running one-vs-the-rest (OvR) classifier is generated per combination of three selected hyper parameter (loss function, regularization, and class weight) values (box 357). The trained classifier includes per-term hyperplanes. Trained models are evaluated using an ALO scorer 365 to select the best performing model for use in inference (also referred to as production). GridSearchCV 362 is a hyper parameter tuning utility provided by scikit-learn (www.scikit-learn.org/stable/modules/grid_search.html). GridSearchCV exhaustively uses all combinations of selected hyper parameter values in a hyper parameter search space 371. For each combination of hyper parameter values, the multi-label document classifier 161 is trained using labels from label classes databases 159 and document features in the document features labeled database 331.

During training (box 161), the output labels of an SVM (OvR) with selected hyper parameter values combination is compared with ground truth labels of the training data 331 using a linear support vector machine classifier (Linear SVC or Linear SVM). For Linear SVC, the value of "kernel" parameter is set as "linear." The Linear SVC constrains growth of dimensionality when generating feature vectors using words in documents thus allowing scalability of the model. A non-linear kernel (e.g., radial basis function (RBF) kernel) can be used but may require substantial computing resources when presented with a large number of samples. This is because in text categorization, the number of words is large causing the dimensionality of feature vectors to be very large. Details of the LinearSVC model and kernel parameter are provided by scikit-learn at http://scikit-learn.org/stable/modules/generated/sklearn.svm.LinearSVC.html.

The goal of Linear SVC is to identify position of a hyperplane which maximizes the margin between two classes of the training data. The distance between the nearest points of the two classes is referred to as margin. In two-dimensional space, the hyperplane is a line represented as $f(x)=wx+b$, where w is the weight vector which is normal to the line $f(x)$ and b is the bias. In a three-dimensional space, the hyperplane is a plane and in n-dimensional space it is a hyperplane. During training the weights in the weight vector are updated using a pre-determined learning rate. The algorithm converges when the margins computed for the training samples, is maximized. Sometimes, the data in the classes is not separable using lines and planes as described above and requires a non-linear hyper-plane to separate the classes. In such cases, the regularization hyper-parameter can be used in combination with a kernel method (also referred to as a kernel trick).

At-Least-One (ALO) Score

The ALO score (or metric) is used to determine performance of the SVM model. A model is scored by considering how many of the ground truth set of labels per document are assigned to the document by the model. During hyper parameter tuning, suppose we want to tune one hyper parameter "h1". Now let us suppose we want to try the following values for h1: [1, 10, 100]. We select a value of "h1" (say 10), train the classifier to obtain a trained classifier (with N SVM hyperplane positions for N class labels). The ALO score is calculated for this trained classifier (or SVM model). We repeat the above process to train classifiers using the next values of the hyper parameter "h1" (i.e, 1, and 100) and calculate the respective ALO scores for the trained classifiers. We select the classifier (with N SVM hyperplane positions) which gives us the best ALO score. Details of the hyper parameters used in hyper parameter tuning is presented below in the section on hyper parameters. The ALO scorer 365 calculates a ratio of the documents with at least one pairwise match between inferred labels and ground truth labels to the total number of documents with at least one ground truth label and stores as model evaluations 367. Consider a simple example, consisting of three documents D1, D2, and D3 to illustrate the calculation of the ALO score. Suppose the ground truth label classes for the three documents are:

D1=[C1, C2]
    D2=[C2]
    D3=[C1, C4]

Now further consider a trained SVM (OvR) model predicts the following label classes for these documents:

D1=[C2, C4]
    D2=[C2]
    D3=[C2, C3]

$$ALO = \frac{\text{Number of documents with at least one correct label class predicted}}{\text{Total number of documents}} \quad (1)$$

The ALO score for the above example is ⅔ (or 33.33%) as D1 and D2 have at least one correct label predicted. In one implementation of the technology disclosed, the ALO scores of the SVM (OvR) models range from 45% (minimum) to 85% (maximum). In another implementation the ALO scores range from 45% to 95%. It is understood that in other implementations, the values of the ALO scores can be greater than 95% and can range up to 100%. In one implementation, a trained SVM (OvR) model is selected for use in production such that the ALO score of the model is within 10% of the maximum ALO score using a pre-determined hyper-parameter search range. One of the reasons for using ALO score to determine performance of a model is that it does not consider documents to which a label is not assigned by a model. This is because while searching for content on the World Wide Web, content may not be available for a particular URL. Such documents may not have any labels assigned to them and may cause bias in model performance. In another implementation, each document always contains content, therefore, the above restriction is removed and all documents are considered when calculating the ALO score. In another implementation, the performance score of a model is a weighted average of the ALO score calculated using equation (1) and a fraction of documents not assigned any label classes by the model.

One-vs-the-Rest Classifier

Figure 4A:
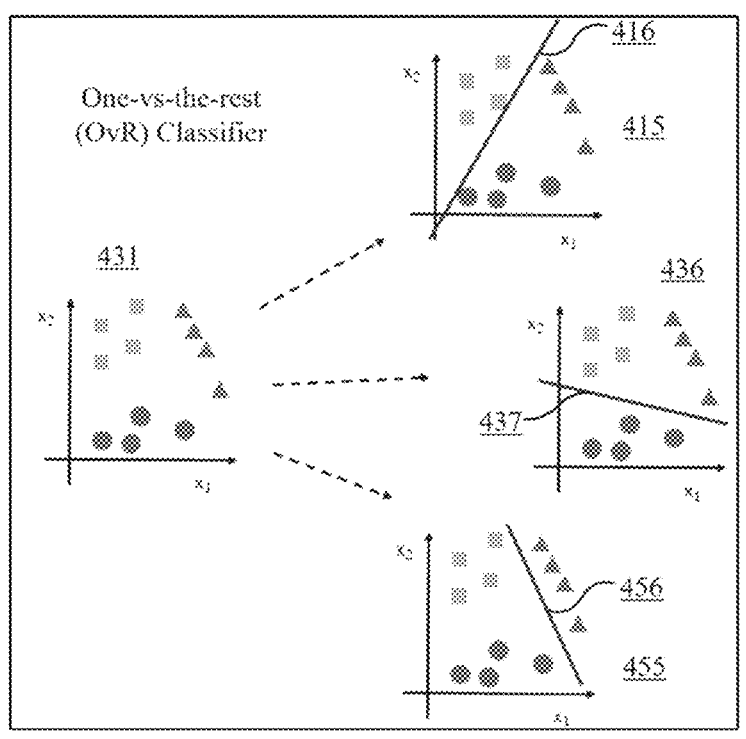
FIG. 4A is an illustration of three hyperplanes, each hyperplane separating labeled data for one class from labeled data for all other classes.
Figure 4B:
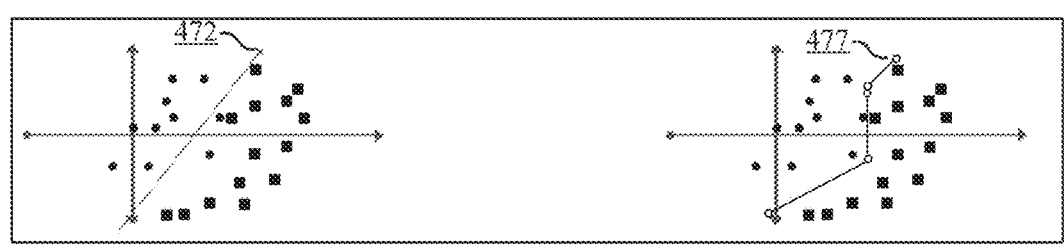
FIG. 4B illustrates the impact of regularization hyper-parameter values on hyperplane shape to separate labeled data for one class from labeled data for all other classes.
Figure 4C:
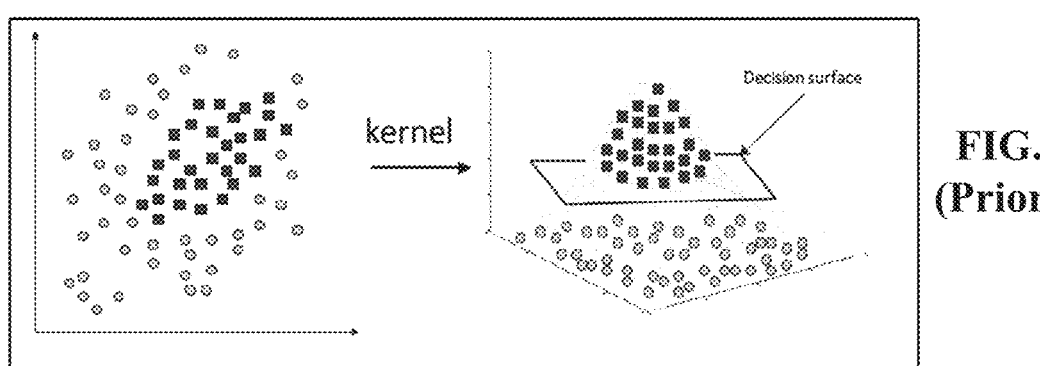
FIG. 4C illustrates a kernel method to transform the data into higher dimensional feature space so that a linear sepa-ration between two classes of data is possible.

FIGS. 4A, 4B, and 4C presents graphical illustrations 400 of running one-vs-the-rest classifier, high versus low values of regularization parameter and kernel method to transform non-linearly separable data to into a higher dimensional feature space. FIG. 4A is illustrates an example of running one-vs-the-rest (OvR) classifier on a data set consisting of data belonging to three classes (squares, circles, and triangles) as shown in the left graph 431. A first hyperplane 416 as shown in the top right graph 415 shows a hyperplane determination for the square class as the ground truth. The hyperplane 416 partitions the data points in the square class from the rest of the data points (circles and triangles). Similarly, graphs 436 and 455 respectively partition data points in circle and triangle classes from other classes in the data via hyperplanes 437 and 456 respectively. As described above, the position of the hyperplane is determined by the weight vector. The training algorithm attempts to maximize the margin of the hyperplane from the ground truth class for generalization, however it may result in incorrect classification of one or more data points as shown in FIG. 4B.

Hyper Parameters

Hyper parameters are parameters that are not directly learnt during training. As described above, in one implementation, three hyper parameters: loss function, regularization and class weight are used in hyper parameter tuning. The "loss" hyper parameter value specifies the loss function: hinge or squared_hinge. Hinge loss is based on the idea of margin maximization when positioning a hyperplane. Hinge is the standard SVM loss function while squared_hinge is the square of the hinge loss. See www.scikit-learn.org/stable/modules/generated/sklearn.svm.LinearSVC.html for further details.

The regularization parameter (often referred to as "C" parameter in SKLearn library, http://scikit-learn.org/stable/modules/generated/sklearn.svm.LinearSVC.html) informs the SVM classifier how much it needs to avoid misclassifying. Regularization parameter controls trade-off between misclassifications and width of margin when positioning a hyperplane. For large values of "C," a smaller margin hyperplane will be selected if that hyperplane does a better job of getting all the training data points classified correctly. For example, a graph 476 in FIG. 4B shows a hyperplane 477 generated using a high value of regularization hyperparameter. Conversely, a very small value of regularization "C" will position the hyperplane with a larger margin from the ground truth class, even if that hyperplane mis-classifies more data points. This is illustrated in a graph 471 in which two circles are misclassified as squares by positioning of the hyperplane 472. As mentioned above, it is not always possible to have a linear separation between two classes of data. SVM can handle such situations by using a kernel method which maps data to a different space where a linear hyperplane can be used to separate classes. This is known as the "kernel trick" where the kernel method transforms the data into the higher dimensional feature space so that a linear separation is possible as shown in FIG. 4C. Then a value of the regularization parameter "C" is used to position the hyper-plane between the two classes as described above.

One factor in misclassification of data points is imbalanced classes. The class weight hyper parameter is used to adjust the regularization "C" parameter in a data set in which some classes are small (minority classes) while others are large (majority classes). One method to handle this imbalance is to multiply "C" parameter with class weight "$w_j$" of class "j" which is inversely proportional to the frequency of class j.

$$C_j = C * w_j \qquad (2)$$

This results in "$C_j$" which is then used as regularization parameter when determining hyperplane for class "j." The general idea is to increase the penalty for misclassifying minority classes to prevent them from being overwhelmed by the majority class. In scikit-learn library, the values of "$C_j$" are automatically calculated for each class when class weight is set as "balanced." In balanced mode the weight of each class "j" is calculated as:

$$w_j = \frac{n}{k * n_j} \qquad (3)$$

Where $w_j$ is the weight of class j, n is the total number of data points in the data set, $n_j$ is the number of observations in class j, and k is the total number of classes. Combinations of values of the above three hyper parameters are used in hyper parameter tuning using the Scikit-Learn utility Grid-SearchCV 362 described above with reference to FIG. 3.

Document Collection from Parked Domains

Figure 5:
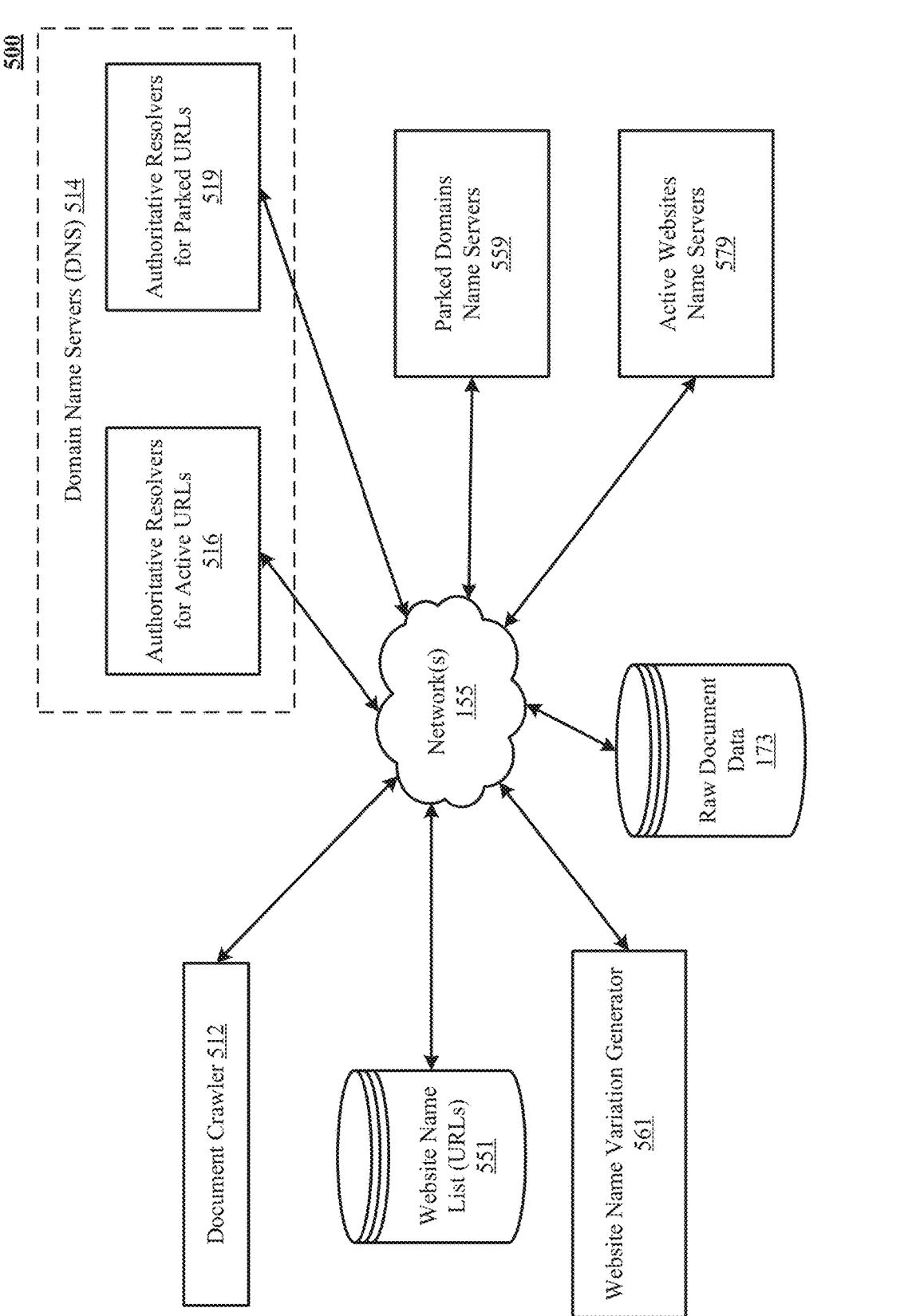
FIG. 5 is an architecture level schematic of a system to generate website names, identify parked domains and collect documents posted on parked domains for classification by the multi-label document classifier of FIG. 1.

FIG. 5 is an architectural level schematic of a system to collect document data from websites on the World Wide Web. The system consists of a document crawler 512, domain name servers (DNS) 514, parked domains name servers 559, active websites name servers 579, the raw document database 173, a website name variation generator 561, a website name list database 551, a document crawler 512, and a network(s) 155. The domain name servers (DNS) 514 comprise of authoritative resolvers for active URLs 516 and authoritative resolvers for parked URLs 519. Domain parking refers to the registration of an internet domain without that domain being associated with any service such as email or a website. Domain parking is typically used to reserve a domain name for future development. Sometimes domain parking is also used to protect against the possibility of cybersquatting. Cybersquatting is the practice of regis- tering domain names, especially similar to names of well- known company or brand names in the hope of reselling them at a profit. Such parked domains sometimes can also be used for phishing or spreading malware. The technology disclosed uses system 500 in FIG. 5 to identify parked domains, collect documents from parked domains and label these documents as collected from parked domains. The documents are then stored in the raw document database 173 for further processing to generate document features for use in training.

The website name variation generator 561 generates URLs that are within a predetermined edit distance of a selected URL. In one implementation, an open-source utility "dnstwist" (https://github.com/elceef/dnstwist) is used to generate such similar-looking domain names. For example, Bank of America's website URL is "www.bankofamerica- .com." The "dnstwist" utility generates multiple variations of the website name e.g., "www.bnakofamerica.com," "www.bankfoamerica.com," "www.bankafamerica.com," etc. Each of the variant URL is passed to the document crawler 512 to collect contents of the website. The document crawler 512 determines whether the requested URL is hosted by one of the parked domains name servers 559 or one of the active website name servers 579. In one implementation, contents from secondary webpages of a website are not collected for generating document features. For example, for "www.espn.com" website, any secondary level webpages such as "baseball.espn.com" are not collected by the docu- ment crawler 512.

In one implementation, the system 500 maintains a list of parked domains name servers 559 for example "sedopark- ing.com", "parkingcrew.com", etc. If the nameserver of the requested URL appears in the list of the parked domain name servers, the document crawler 512 labels the docu- ment as collected from a parked domain. In case URL of the requested document is redirected, the technology disclosed determines that URL resolution is referred to an authorita- tive nameserver that appears in the list of parked domain nameservers 519 and labels the document as obtained from a parked domain.

Examples of Multi-Label Document Classification

Figure 6:
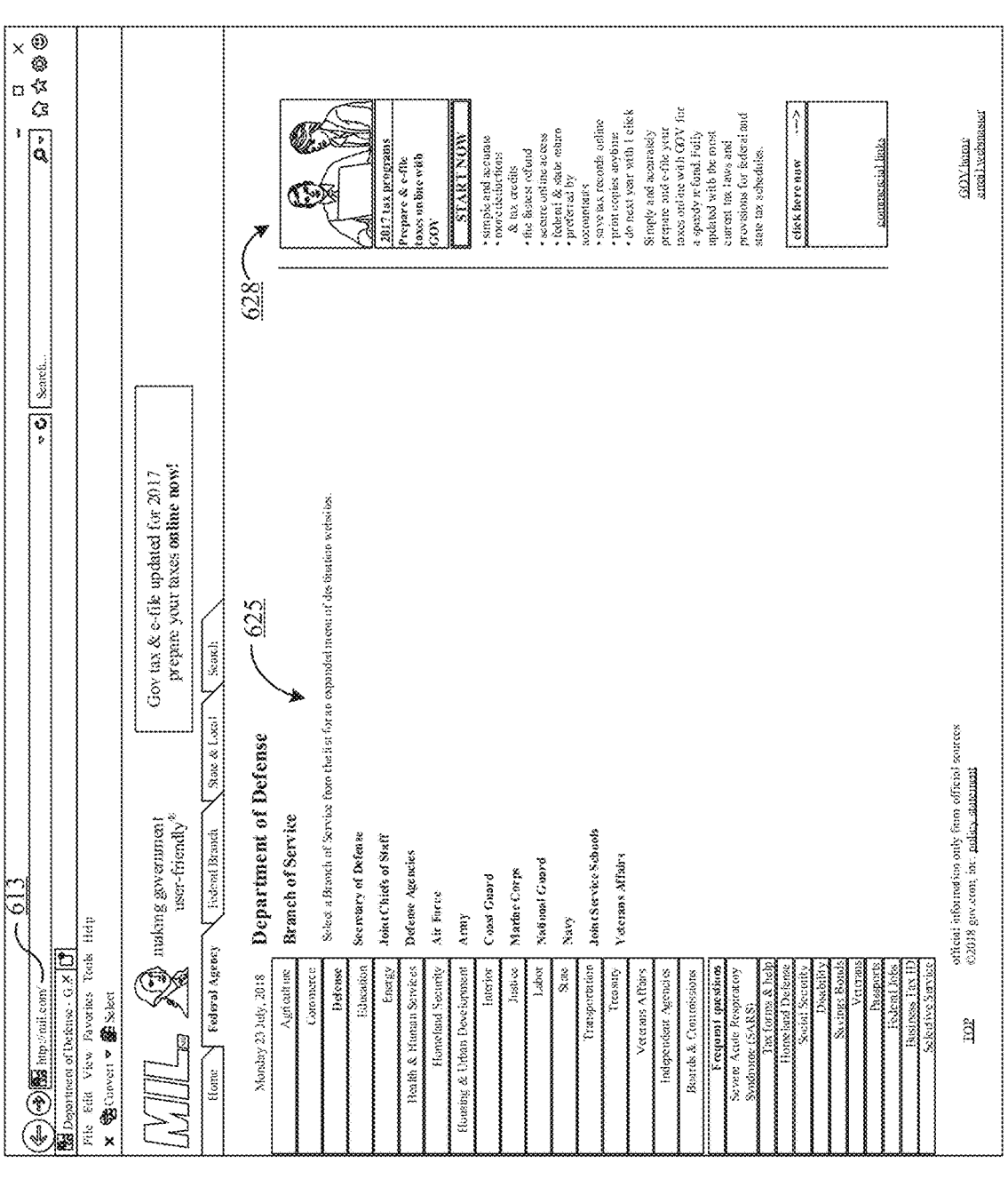
FIG. 6 is an illustration of a website used as a first example to illustrate harvesting of labels using multi-label document classifier of FIG. 1.

FIG. 6 is an illustration of a website 600 to harvest labels using multi-label document classifier 161. This is a Depart- ment of Defense website accessed by a URL "http://mil- .com" 613. The landing page of the website provides links to different branches of service in the Department of Defense as indicated by a label 625. The website also provides information about filing tax returns in a panel 628 on the right side of the landing webpage. The system 500 in FIG. 5 is used to collect contents from this website and store it in the raw document database 173. Following this, the fre- quency-based document feature generator 245 uses tf-idf technique to generate document features which are then stored in the document features database 175. The trained multi-label document classifier 161 is used to classify the document. In this example, a set of 70 label classes are used. However, as described earlier, the multi-label document classifier 161 can use more label classes to provide finer granularity classification. On the other hand, the adminis- trator can also use fewer label classes for classification of document, if so desired.

Figure 7:
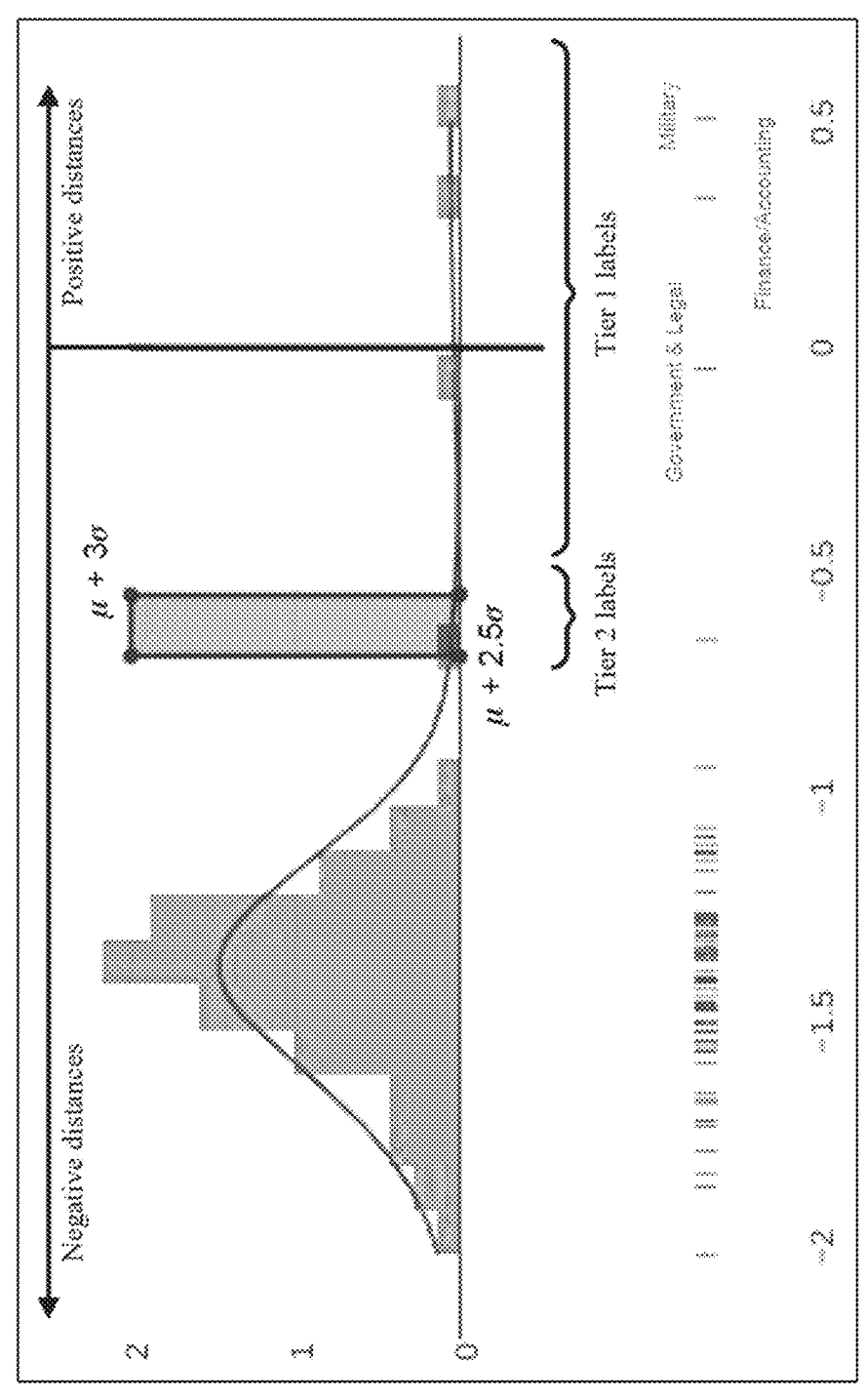
FIG. 7 is a graph illustrating distribution of labels with positive and negative distances between SVM hyperplanes for the labels and feature vector of the document collected from website of FIG. 6.

FIG. 7 is a graph 700 illustrating distance of feature vector representing document features for the website 600 from support vector machine (SVM) hyperplanes for the 70 labels used for classification of the document. The distance of feature vector from the labels is plotted on horizontal axis. The feature vector of has positive distance from two label classes "military" and "finance/accounting" as shown on the graph. As shown in FIG. 6, the landing webpage of "mil- .com" website has content related to military (625) and accounting/finance (628) labels, the feature vector of docu- ment features has positive distances from these two label classes. These two labels are harvested by multi-label docu- ment classifier 161 as tier 1 labels for labeling the document. In the graph 700, the feature vector has negative distance from the remaining label classes. These negative distances follow a Gaussian distribution therefore, the negative dis- tances of feature vector from labels is characterized by a mean ($\mu$) and standard deviation ($\sigma$) values.

Tier 1 labels also include label classes with negative distances between the mean negative distance ($\mu$) and zero and separated from the mean negative distance ($\mu$) by a predetermined first number of standard deviations ($\sigma$). In one implementation, the first number of standard deviations is between 2.8 and 3.2. The example shown in FIG. 7 uses a value of "3" as the first number of standard deviations. Therefore, the label classes with negative distance greater than $\mu+3\sigma$ and less than zero are included in tier 1 labels. The "government & legal" label class has a negative distance in the above range and is included in the tier 1 labels for "mil.com" website. The technology disclosed can be applied by selecting the first number of standard deviations used by the harvester from a broader range of standard deviations, setting the first number between 2.5 and 3.5 or between 2.0 and 4.2 standard deviations.

In one implementation, if harvesting of tier 1 labels does not result in any label classes for a document, the multi-label document classifier harvests tier 2 labels. The tier 2 labels include labels with negative distances between the mean negative distance ($\mu$) and the first number of standard deviations and separated from the mean negative distance ($\mu$) by a predetermined second number of standard deviations ($\sigma$). In one implementation, the second number of standard deviations is between 2.4 and 2.6. The value for the second number of standard deviations is selected to balance between not collecting too many labels versus getting at least one label for the document. In the graph 700, the first number of standard deviations is "3" and the second number of standard deviations is selected as "2.5". Therefore, tier 2 labels have negative distances between $\mu$+2.5$\sigma$ and $\mu$+3$\sigma$. The technology disclosed can be applied with the a value of the second number of standard deviations between 2 and 3 or between 1.6 and 3.3 as the harvester can be adapted to select labels when the second number of standard deviations is selected in those ranges.

Figure 8:
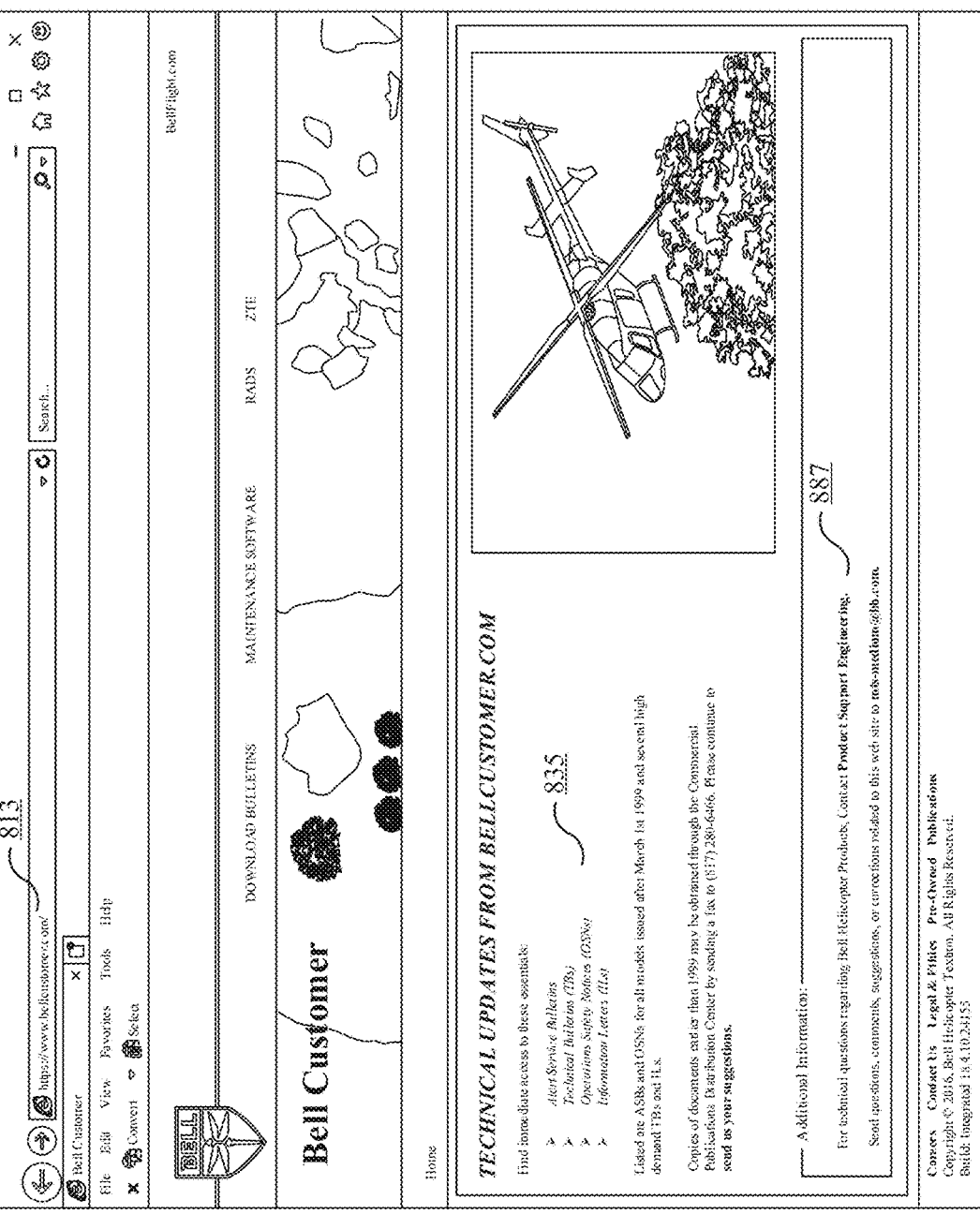
FIG. 8 is an illustration of a website used as a second example to illustrate harvesting of labels using multi-label document classifier of FIG. 1.
Figure 9:
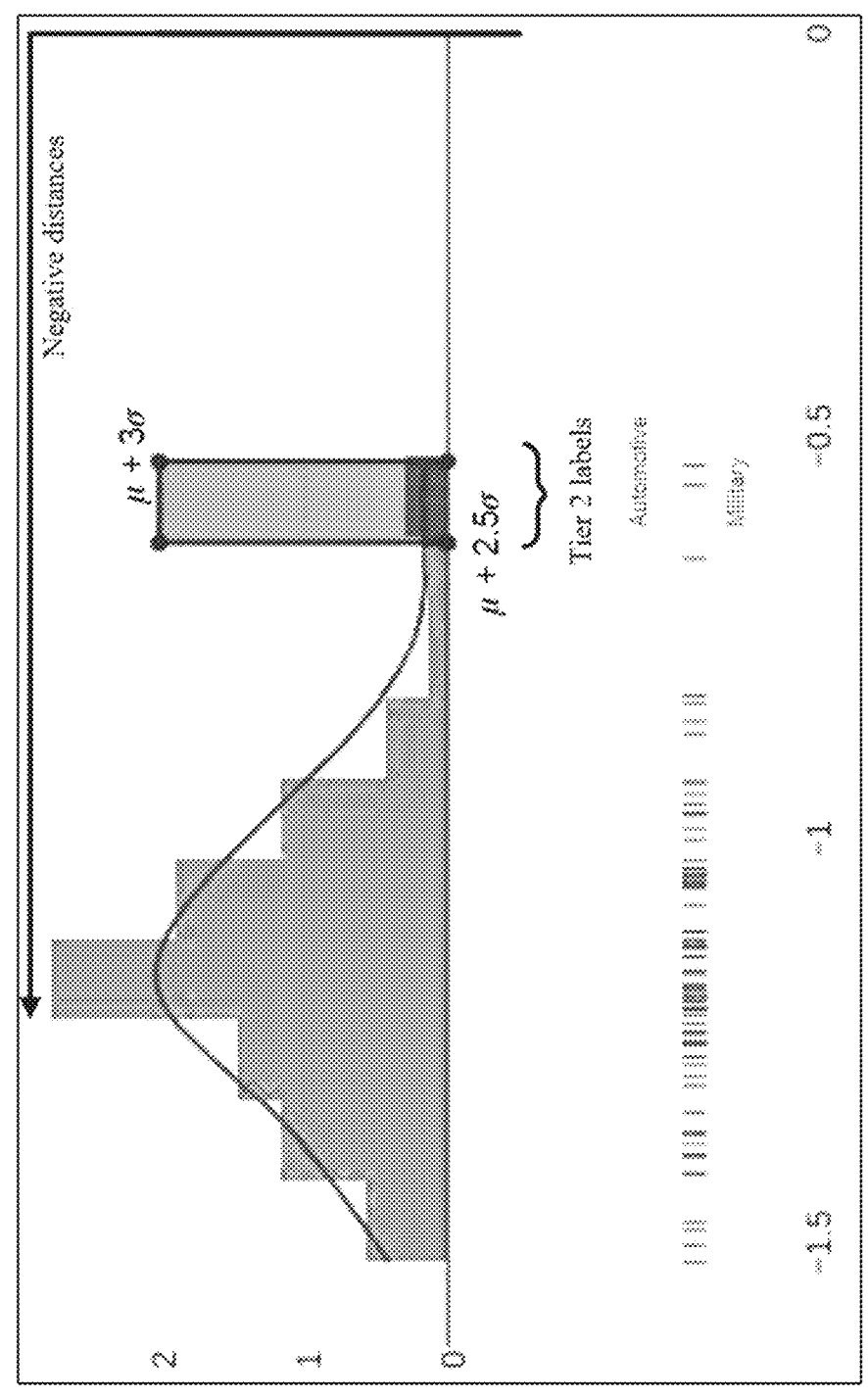
FIG. 9 is a graph illustrating distribution of class labels with negative distances between SVM hyperplanes for the labels and feature vector of document collected from web-site of FIG. 8.

FIG. 8 is an illustration of a website 800 presented as an example for assigning label classes. The website is accessed by a URL 813 "https://www.bellcustomer.com". The contents of the landing page includes a list of technical bulletins (835) and a link to product support engineering for Bell Helicopter™ products (887). The distance of feature vector of document features from label classes generated by the multi-label document classifier 161 is shown in graph 900 in FIG. 9. As shown on the graph, there are no labels having positive distance from the feature vector. Additionally, there are no label classes with negative distance between the mean negative distance ($\mu$) and zero and separated from the mean negative distance ($\mu$) by a predetermined first number of standard deviations ($\sigma$). In the example, the first number of standard deviations is selected as 3. However, as described above a different value of first number of standard deviation can be selected in other implementations. In the example of FIG. 9, the harvesting of tier 1 class labels does not return any label classes. The multi-label document classifier 161 then harvests tier 2 labels which include class labels with negative distance from feature vector of the document. The tier 2 labels include labels with negative distances between the mean negative distance ($\mu$) and the first number of standard deviations and separated from the mean negative distance ($\mu$) by a predetermined second number of standard deviations ($\sigma$). The example uses "3" for the first number of standard deviations and "2.5" for the second number of standard deviations. In other implementations, different values for the first and the second number of standard deviations can be used as described above. In one implementation, values for the first number of standard deviations and the second number of standard deviations are selected based on performance of a model using the ALO metric. Following the harvesting of tier 2 labels, two labels "automotive" and "military" are assigned to the website accessed by the URL "https://www.bellcustomer.com". Thus, the multi-label document classifier 161 is able to assign labels to the document obtained from the website 900 even if there is no class label with a positive distance from the feature vector. Existing SVM (OvR) would have left the document unlabeled as it considers positive classes during classification.

The labels assigned to the document are then used by the inline proxy for enterprise policy enforcement.

Computer System

Figure 10:
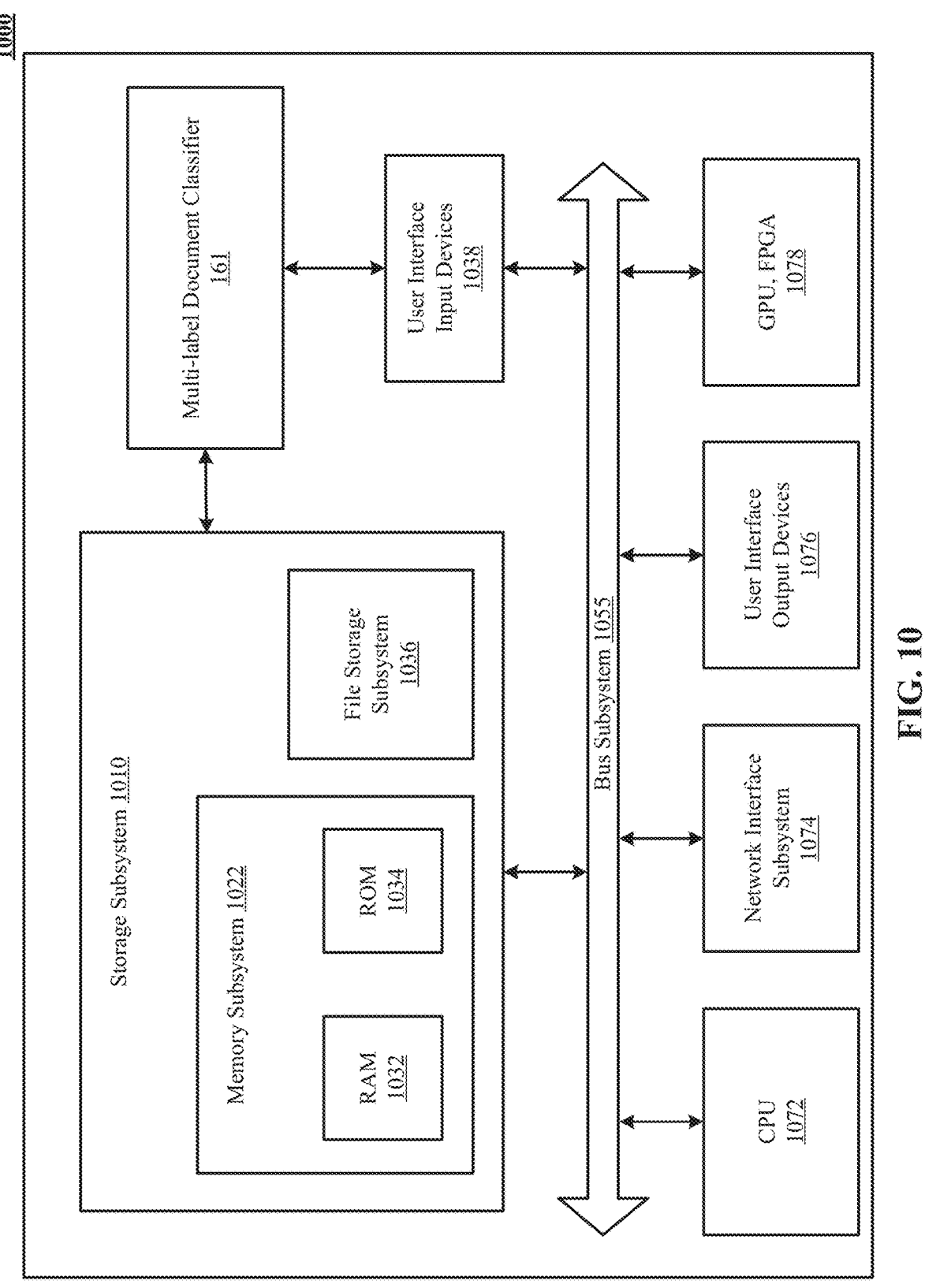
FIG. 10 is a simplified block diagram of a computer system that can be used to implement the technology dis-closed.

FIG. 10 is a simplified block diagram of a computer system 1000 that can be used to implement the multi-label document classifier 161 of FIG. 1. Computer system 1000 includes at least one central processing unit (CPU) 1072 that communicates with a number of peripheral devices via bus subsystem 1055. These peripheral devices can include a storage subsystem 1010 including, for example, memory devices and a file storage subsystem 1036, user interface input devices 1038, user interface output devices 1076, and a network interface subsystem 1074. The input and output devices allow user interaction with computer system 1000. Network interface subsystem 1074 provides an interface to outside networks, including an interface to corresponding interface devices in other computer systems.

In one implementation, the multi-label document classifier 161 of FIG. 1 is communicably linked to the storage subsystem 1010 and the user interface input devices 1038.

User interface input devices 1038 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1000.

User interface output devices 1076 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1000 to the user or to another machine or computer system.

Storage subsystem 1010 stores programming and data constructs that provide the functionality of some or all of the modules and methods described herein. Subsystem 1078 can be graphics processing units (GPUs) or field-programmable gate arrays (FPGAs).

Memory subsystem 1022 used in the storage subsystem 1010 can include a number of memories including a main random access memory (RAM) 1032 for storage of instructions and data during program execution and a read only memory (ROM) 1034 in which fixed instructions are stored. A file storage subsystem 1036 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1036 in the storage subsystem 1010, or in other machines accessible by the processor.

Bus subsystem 1055 provides a mechanism for letting the various components and subsystems of computer system 1000 communicate with each other as intended. Although bus subsystem 1055 is shown schematically as a single bus, alternative implementations of the bus subsystem can use multiple buses.

Computer system 1000 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1000 depicted in FIG. 10 is intended only as a specific example for purposes of illustrating the preferred embodiments of the present invention. Many other configurations of computer system 1000 are possible having more or less components than the computer system depicted in FIG. 10.
Particular Implementations The technology disclosed relates to multi-label classification of documents obtained from a wide variety of website classes for implementing fine grained enterprise policies.

The technology disclosed can be practiced as a system, method, device, product, computer readable media, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A first system implementation of the technology disclosed includes one or more processors coupled to memory. The memory is loaded with computer instructions to train a multi-label support vector machine (abbreviated SVM) running a one-vs-the-rest (abbreviated OVR) classifier. The system accesses training examples for documents belonging to 50 to 250 label classes. The system trains an SVM using the document features for one-vs-the-rest training and hyperplane determinations on the label classes. The system stores parameters of the trained SVM on the label classes for use in production of multi-label classifications of documents.

The first system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The document features include frequency features based on term frequency-inverse document frequency (abbreviated TF-IDF). The document features include semantic features based on embedding in a multi-dimensional vector space using Word2Vec. The document features include semantic features based on embedding in a multi-dimensional vector space using global vectors for word representation (abbreviated GloVe).

The system selects the SVM hyper parameters across regularization, class weight, and loss function in a predetermined search range such that an at-least-one (abbreviated ALO) score is at or within ten percent of maximum attainable over the predetermined search range. In such an implementation, the ALO score calculates a ratio of count of the documents with at least one pairwise match between inferred labels and ground truth labels to the total number of documents with at least one ground truth label.

In one implementation, one of the label classes is parked domain. For the documents posted on parked domains, the system identifies parked domains and collecting documents posted on the parked domains. In such an implementation, the system crawls websites accessible by uniform resource locators (abbreviated URLs) that are within a predetermined edit distance of selected URL names. The system determines for at least some of the crawled URLs that URL resolution is referred to an authoritative nameserver that appears in a list of parked domain nameservers identified as dedicated to parked domains. The system collects the documents posted on the crawled URLs that are referred to the parked domain nameservers. The system labels the collected documents as collected from the parked domains and stores the documents and parked domain labels for use in training.

Other implementations may include a non-transitory computer readable storage medium storing instructions executable by a processor to perform functions of the system described above. Yet another implementation may include a method performing the functions of the system described above.

A first method implementation of the technology disclosed includes training a multi-label support vector machine (abbreviated SVM) running a one-vs-the-rest (abbreviated OVR) classifier. The method includes accessing training examples for documents belonging to 50 to 250 label classes. Following this, the method includes training an SVM using the document features for one-vs-the-rest training and hyperplane determinations on the label classes. The method includes storing parameters of the trained SVM on the label classes for use in production of multi-label classifications of documents.

Each of the features discussed in this particular implementation section for the first system implementation apply equally to this method implementation. As indicated above, all the system features are not repeated here and should be considered repeated by reference.

Other implementations may include a non-transitory computer readable storage medium storing instructions executable by a processor to perform the first method described above. Yet another implementation may include a system including memory and one or more processors operable to execute instructions, stored in the memory, to perform the first method described above.

Computer readable media (CRM) implementations of the technology disclosed include a non-transitory computer readable storage medium impressed with computer program instructions, when executed on a processor, implement the method described above.

Each of the features discussed in this particular implementation section for the first system implementation apply equally to the CRM implementation. As indicated above, all the system features are not repeated here and should be considered repeated by reference.

A second system implementation of the technology disclosed includes one or more processors coupled to memory. The memory is loaded with computer instructions to perform multi-label SVM classification of a document. The system creates document features representing frequencies or semantics of words in the document. The system applies trained SVM classification parameters for a plurality of labels to the document features for the document and determines positive or negative distances between SVM hyperplanes for the labels and the feature vector. The system harvests the labels with a positive distance. The system further harvests the labels with a negative distance and a strong separation from a distribution of the negative distances. When the distribution negative distance is characterized by a mean and standard deviation, the strong separation is defined such that the harvested labels include the labels with a negative distance between the mean negative distance and zero and separated from the mean negative distance by a predetermined first number of standard deviations. Finally, the system outputs a list of harvested tier 1 labels.

The second system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

In one implementation, the first number of standard deviations is between 3.0 and 4.0. The system harvests as tier 2 labels the labels with a negative distance between the mean negative distance and the first number of standard deviations and separated from the mean negative distance by a predetermined second number of standard deviations. Following this, the system outputs the tier 2 labels with the list. In such an implementation, the second number of standard deviations is between 2.0 and 3.0.

Other implementations may include a non-transitory computer readable storage medium storing instructions executable by a processor to perform functions of the system described above. Yet another implementation may include a method performing the functions of the system described above.

A second method implementation of the technology disclosed includes performing multi-label SVM classification of a document. The method includes creating document features representing frequencies or semantics of words in the document. The method includes applying trained SVM classification parameters for a plurality of labels to the document features for the document and determines positive or negative distances between SVM hyperplanes for the labels and the feature vector. Following this, the method includes harvesting the labels with a positive distance. The method includes further harvesting the labels with a negative distance and a strong separation from a distribution of the negative distances. When the distribution negative distance is characterized by a mean and standard deviation, the strong separation is defined such that the harvested labels include the labels with a negative distance between the mean negative distance and zero and separated from the mean negative distance by a predetermined first number of standard deviations. Finally, the method includes outputting a list of harvested tier 1 labels.

Each of the features discussed in this particular implementation section for the second system implementation apply equally to this method implementation. As indicated above, all the system features are not repeated here and should be considered repeated by reference.

Other implementations may include a non-transitory computer readable storage medium storing instructions executable by a processor to perform the second method described above. Yet another implementation may include a system including memory and one or more processors operable to execute instructions, stored in the memory, to perform the second method described above.

Computer readable media (CRM) implementations of the technology disclosed include a non-transitory computer readable storage medium impressed with computer program instructions, when executed on a processor, implement the method described above.

Each of the features discussed in this particular implementation section for the second system implementation apply equally to the CRM implementation. As indicated above, all the system features are not repeated here and should be considered repeated by reference.

The invention claimed is:

1. A method, comprising:
training a multi-label classifier, the training comprising:
creating document features representing aspects of words in each of a plurality of training documents belonging to a plurality of label classes;
training a support vector machine with the document features for one-vs-the-rest classification using the plurality of label classes, the training comprising:
training a one-vs-the-rest classifier a number of times such that the one-vs-the-rest classifier is trained one time for each of the plurality of label classes, each training including:
providing the training documents belonging to the respective label class to the support vector machine running the one-vs-the-rest classifier to obtain training output labels, and
comparing the training output labels using a linear support vector machine classifier to generate the number of hyperplane determinations that separate each label class of the plurality of label classes from the rest of the plurality of label classes; and
storing parameters of the trained support vector machine, wherein the parameters comprise the hyperplane determinations.

2. The method of claim 1, further comprising:
deploying the trained multi-label classifier and the stored parameters of the trained support vector machine to a production environment.

3. The method of claim 1, further comprising:
classifying a document with multiple label classes of the plurality of label classes using the trained multi-label classifier.

4. The method of claim 1, further comprising:
classifying a document with a label class of the plurality of label classes using the trained multi-label classifier.

5. The method of claim 1, wherein the document features comprise frequency features based on term frequency-inverse document frequency.

6. The method of claim 1, wherein the document features comprise semantic features based on embedding in a multi-dimensional vector space using Word2Vec.

7. The method of claim 1, wherein the document features comprise semantic features based on embedding in a multi-dimensional vector space using global vectors for word representation.

8. The method of claim 1, further comprising:
selecting support vector machine hyper parameters across regularization, class weight, and loss function in a predetermined search range to generate an at-least-one (ALO) score within ten percent of maximum attainable over the predetermined search range.

9. The method of claim 8, wherein the ALO score is calculated based on a ratio of a count of the documents with at least one pairwise match between inferred labels and ground truth labels to a total number of documents with at least one ground truth label.

10. The method of claim 1, wherein a first label class of the plurality of label classes is parked domain to classify documents posted on parked domains, the method further comprising:

identifying parked domains and collecting documents posted on the parked domains, the identifying comprising:

crawling uniform resource locators (URLs) that are within a predetermined edit distance of selected URL names;

determining for at least some of the crawled URLs that URL resolution is referred to an authoritative nameserver that appears in a list of parked domain nameservers identified as dedicated to parked domains; and collecting the documents posted on the crawled URLs that are referred to the parked domain nameservers; and labeling the collected documents as collected from the parked domains and storing the documents and parked domain labels for use in training.

11. A system, comprising:

one or more processors; and one or more memories having stored thereon instructions that, upon execution by the one or more processors, cause the one or more processors to:

train a multi-label classifier, the training comprising:

creating document features representing aspects of words in each of a plurality of training documents belonging to a plurality of label classes;

training a support vector machine with the document features for one-vs-the-rest classification using the plurality of label classes, the training comprising:

training a one-vs-the-rest classifier a number of times such that the one-vs-the-rest classifier is trained one time for each of the plurality of label classes, each training including:

providing the training documents belonging to the respective label class to the support vector machine running the one-vs-the-rest classifier to obtain training output labels, and comparing the training output labels using a linear support vector machine classifier to generate the number of hyperplane determinations that separate each label class of the plurality of label classes from the rest of the plurality of label classes; and storing parameters of the trained support vector machine, wherein the parameters comprise the hyperplane determinations.

12. The system of claim 11, wherein the instructions comprise further instructions that, upon execution by the one or more processors, cause the one or more processors to:

deploy the trained multi-label classifier and the stored parameters of the trained support vector machine to a production environment.

13. The system of claim 11, wherein the instructions comprise further instructions that, upon execution by the one or more processors, cause the one or more processors to:

classify a document with multiple label classes of the plurality of label classes using the trained multi-label classifier.

14. The system of claim 11, wherein the instructions comprise further instructions that, upon execution by the one or more processors, cause the one or more processors to:

classify a document with a label class of the plurality of label classes using the trained multi-label classifier.

15. The system of claim 11, wherein the document features comprise frequency features based on term frequency-inverse document frequency.

16. The system of claim 11, wherein the document features comprise semantic features based on embedding in a multi-dimensional vector space using Word2Vec.

17. The system of claim 11, wherein the document features comprise semantic features based on embedding in a multi-dimensional vector space using global vectors for word representation.

18. The system of claim 11, wherein the instructions comprise further instructions that, upon execution by the one or more processors, cause the one or more processors to:

select support vector machine hyper parameters across regularization, class weight, and loss function in a predetermined search range to generate an at-least-one (ALO) score within ten percent of maximum attainable over the predetermined search range.

19. The system of claim 18, wherein the ALO score is calculated based on a ratio of a count of the documents with at least one pairwise match between inferred labels and ground truth labels to a total number of documents with at least one ground truth label.

20. The system of claim 11, wherein a first label class of the plurality of label classes is parked domain to classify documents posted on parked domains, and wherein the instructions comprise further instructions that, upon execution by the one or more processors, cause the one or more processors to:

identify parked domains and collecting documents posted on the parked domains, the identifying comprising:

crawling uniform resource locators (URLs) that are within a predetermined edit distance of selected URL names;

determining for at least some of the crawled URLs that URL resolution is referred to an authoritative nameserver that appears in a list of parked domain nameservers identified as dedicated to parked domains; and collecting the documents posted on the crawled URLs that are referred to the parked domain nameservers; and label the collected documents as collected from the parked domains and storing the documents and parked domain labels for use in training.

* * * * *